(12) United States Patent
Griffin et al.

(10) Patent No.: US 11,360,924 B1
(45) Date of Patent: Jun. 14, 2022

(54) QUANTUM MESSAGE BUS USING SUPERDENSE ENCODING

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/215,799

(22) Filed: Mar. 29, 2021

(51) Int. Cl.
*G06F 13/40* (2006.01)
*G06N 10/00* (2022.01)

(52) U.S. Cl.
CPC ......... *G06F 13/4068* (2013.01); *G06N 10/00* (2019.01)

(58) Field of Classification Search
None
See application file for complete search history.

(56) References Cited

U.S. PATENT DOCUMENTS

| | | | |
|---|---|---|---|
| 7,248,695 B1 | 7/2007 | Beal et al. | |
| 8,885,828 B2 | 11/2014 | Wiseman et al. | |
| 9,654,287 B2 | 5/2017 | Zhao et al. | |
| 10,756,826 B1 * | 8/2020 | Coady | H04B 10/70 |
| 2019/0394030 A1 | 12/2019 | Forbes et al. | |

FOREIGN PATENT DOCUMENTS

CN 102082662 B 4/2012

OTHER PUBLICATIONS

Cacciapuoti, Angela S. et al., "When Entanglement Meets Classical Communications: Quantum Teleportation for the Quantum Internet," IEEE Transactions on Communications, Mar. 2020, pp. 1-26, available online at https://www.researchgate.net/publication/339699758_When_Entanglement_Meets_Classical_Communications_Quantum_Teleportation_for_the_Quantum_Internet.
Mari, Andrea, et al., "Transfer Learning in Hybrid Classical-Quantum Neural Networks," Quantum 4, 340, Oct. 2020, pp. 1-13, available online at https://arxiv.org/abs/1912.08278.

* cited by examiner

*Primary Examiner* — Farley Abad
*Assistant Examiner* — Dayton Lewis-Taylor
(74) *Attorney, Agent, or Firm* — Dority & Manning, P.A.

(57) ABSTRACT

A quantum message bus using superdense encoding to provide communications between services running on quantum computing devices and/or classical computing devices is disclosed herein. In one example, a message bus listener service executing on a first quantum computing device receives, via the message bus, a message sent from a sending service running on the first quantum computing device directed to a recipient service executing on a second quantum computing device. A quantum communication driver (QCD) service of the first quantum computing device identifies the second quantum computing device as a remote quantum computing device, and performs superdense encoding of the message using a first set of qubits that are entangled with a second set of qubits of the second quantum computing device. The first set of qubits are then sent to the second quantum computing device, which, in some examples, decodes and transmits the message to the recipient service.

20 Claims, 8 Drawing Sheets

US 11,360,924 B1

QUANTUM MESSAGE BUS USING SUPERDENSE ENCODING

BACKGROUND

Quantum computing involves the use of quantum bits, referred to herein as "qubits," which have characteristics that differ from those of classical (i.e., non-quantum) bits used in classical computing. For example, a pair of qubits may experience a physical phenomenon referred to as "entanglement," in which the quantum state of each qubit cannot be described independently of the state of the other qubit. As quantum computing continues to increase in popularity and become more commonplace, the facilitation of communications between and among quantum computing devices and classical computing devices will be desirable.

SUMMARY

The examples disclosed herein implement a quantum message bus that enables superdense encoding of messages sent between services running on quantum computing devices while also enabling communications between such services and services running on classical computing devices. In this manner, messages may be securely, efficiently, and transparently routed among services regardless of whether the services are executing on quantum computing devices or classical computing devices.

In one example, a method for providing a quantum message bus using superdense encoding is disclosed. The method comprises receiving, by a first message bus listener service, a first message via a first message bus of a first quantum computing device from a sending service of the first quantum computing device to a first recipient service of a second quantum computing device. The method further comprises identifying, by a first quantum communication driver (QCD) service, the second quantum computing device as a remote quantum computing device. The method also comprises performing, by the first QCD service, superdense encoding of the first message using one or more first qubits that are each in an entangled state with a corresponding one or more second qubits of the second quantum computing device. The method additionally comprises sending the one or more first qubits to the second quantum computing device.

In another example, a computing system for providing a quantum message bus using superdense encoding is disclosed. The first quantum computing device comprises a first system memory, a first message bus, and a first processor device coupled to the first system memory and implementing one or more first qubits. The first processor device is to receive, using a first message bus listener service, a first message via the first message bus from a sending service of the first quantum computing device to a first recipient service of a second quantum computing device. The first processor device is further to identify, using a first quantum communication driver (QCD) service, the second quantum computing device as a remote quantum computing device. The first processor device is also to perform, using the first QCD service, superdense encoding of the first message using the one or more first qubits that are each in an entangled state with a corresponding one or more second qubits of the second quantum computing device. The first processor device is additionally to send the one or more first qubits to the second quantum computing device.

In another example, a computer program product is provided. The computer program product comprises a non-transitory computer-readable medium having stored thereon computer-executable instructions which, when executed, cause one or more processor devices to receive a first message via the first message bus from a sending service of a first quantum computing device to a first recipient service of a second quantum computing device. The computer-executable instructions further cause the one or more processor devices to identify the second quantum computing device as a remote quantum computing device. The computer-executable instructions also cause the one or more processor devices to perform superdense encoding of the first message using the one or more first qubits that are each in an entangled state with a corresponding one or more second qubits of the second quantum computing device. The computer-executable instructions additionally cause the one or more processor devices to send the one or more first qubits to the second quantum computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
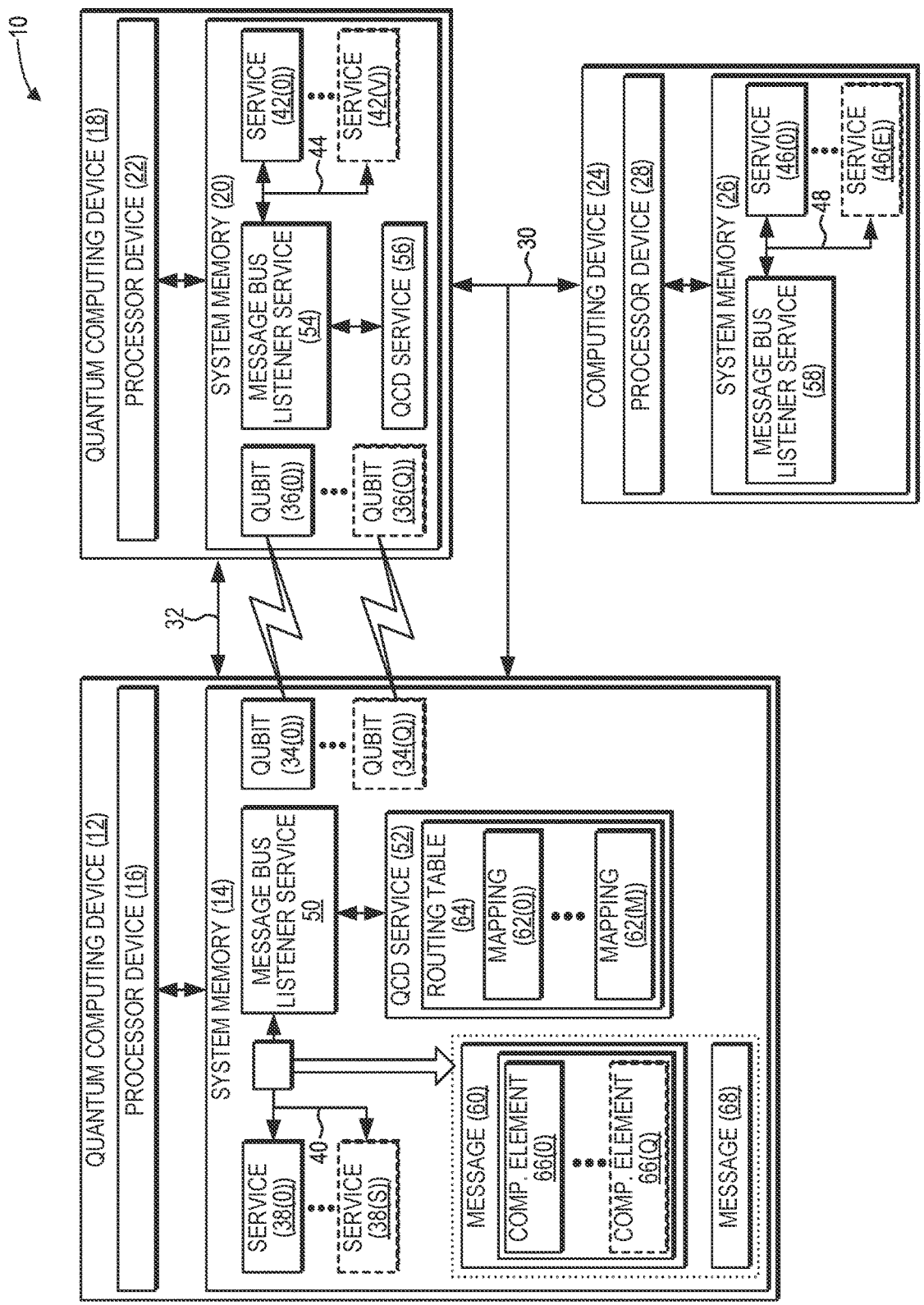
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum computing device" and "second quantum computing device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As discussed above, quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit. Classical computing has no corollaries to superposition and entanglement.

The phenomenon of entanglement underlies a quantum communication protocol known as "superdense encoding," which allows two classical bits of information to be transmitted from a sender to a recipient by sending only one qubit from the sender to the recipient. To use superdense encoding, the sender and the recipient each must first be in possession of one qubit of a pair of entangled qubits. The sender can then encode two classical bits of information by manipulating the sender's entangled qubit (i.e., by performing a quantum gate operation such as a bit flip operation and/or a phase flip operation, as non-limiting examples), which allows the sender to prearrange the result of the recipient's measurement of the pair of entangled qubits. After the sender sends the entangled qubit to the recipient, the recipient can then perform measurements on the pair of entangled qubits to decode the two classical bits of information.

Superdense encoding can be leveraged to decrease the number of data bits transmitted via a communications network by half, and as a result may offer benefits in terms of network optimization and bandwidth management, particularly when designing cloud-based service architectures. Superdense encoding may prove especially beneficial for services that have a sensitivity to network availability, and thus require network access that is subject to legal contracts such as service level agreements. It is desirable to provide mechanisms to enable superdense encoding of messages sent between services running on quantum computing devices while also enabling communications between such services and services running on classical computing devices.

The examples disclosed herein implement a quantum message bus using superdense encoding to provide communications between services running on quantum computing devices and/or classical computing devices. The term "service" and derivatives thereof are used herein to refer to a process that executes on a quantum computing device or a classical computing device, and may include quantum processes that access one or more qubits to provide a desired functionality. The term "quantum message bus" and derivatives thereof are used herein to refer to an inter-device communications link that effectively connects local message buses on separate computing devices to enable communications between services on the separate computing devices, while taking advantage of superdense encoding when possible.

To provide a quantum message bus using superdense encoding, a message bus listener service executing on a first quantum computing device monitors a message bus (i.e., a local bus within the quantum computing device over which services can communicate). The message bus listener service receives, via the message bus, a message sent from a sending service running on the first quantum computing device directed to a recipient service executing on a second quantum computing device. A QCD service of the first quantum computing device identifies the second quantum computing device as a remote quantum computing device (e.g., using a service-to-device mapping maintained by the first QCD service, as a non-limiting example).

The QCD service then performs superdense encoding of the message using a first set of qubits that are entangled with a second set of qubits of the second quantum computing device. The first set of qubits are sent to the second quantum computing device, using, as a non-limiting example, a quantum channel between the first quantum computing device and the second quantum computing device. In some examples, the second quantum computing device receives the first set of qubits using its own QCD service, performs superdense decoding of the message using the first and second sets of qubits, and transmits the message to the recipient service using a message bus of the second quantum computing device. In this manner, messages may be efficiently and securely transmitted between services running on different quantum computing devices.

Some examples may provide that the message bus listener service of the quantum computing device may receive a message directed to a recipient service running on a conventional classical computing device. In such examples, the QCD service of the quantum computing device running the sending service identifies the classical computing device as a remote classical computing device and transmits the message to the recipient service using a classical communications link. The quantum message bus in such examples thus acts as a bridge enabling communications between services running on quantum computing devices and services running on classical computing devices.

FIG. 1 is a block diagram of a quantum computing system 10 according to one example. The quantum computing system 10 includes a first quantum computing device 12 that comprises a first system memory 14 and a first processor device 16, and also includes a second quantum computing device 18 that comprises a second system memory 20 and a second processor device 22. The quantum computing system 10 of FIG. 1 also includes a third computing device 24, which is a classical computing device comprising a third system memory 26 and a third processor device 28. The first quantum computing device 12, the second quantum computing device 18, and the third computing device 24 are all communicatively coupled via a classical communications link 30, which may comprise a private network or a public network such as internet. In additional, the first quantum computing device 12 and the second quantum computing device 18 are communicatively coupled via a quantum channel 32, which may comprise any communications channel over which qubits may be sent (such as, e.g., fiber optic cabling or pulsed lasers, as non-limiting examples). It is to be understood that the quantum computing system 10 according to some examples may include other classical computing devices and/or quantum computing devices that are not illustrated in FIG. 1. Additionally, the first quantum computing device 12, the second quantum computing device 18, and or the third computing device 24 in some examples may include constituent elements in addition to those illustrated in FIG. 1.

The first quantum computing device 12 and the second quantum computing device 18 in the example of FIG. 1 may be close in physical proximity to one another or may be relatively long distances from one another. The first quantum computing device 12 and the second quantum computing device 18 operate in quantum environments but can operate using classical computing principles or quantum computing principles. When using quantum computing principles, the first quantum computing device 12 and the second quantum computing device 18 perform computations that utilize quantum-mechanical phenomena, such as superposition and/or entanglement states. The first quantum computing device 12 and the second quantum computing device 18 each may operate under certain environmental conditions, such as at or near zero degrees (0°) Kelvin. When using classical computing principles, the first quantum computing device 12 and the second quantum computing device 18 utilize binary digits that have a value of either zero (0) or one (1).

In the example of FIG. 1, the first quantum computing device 12 maintains a set of one or more first qubits 34(0)-34(Q), which are in a state of entanglement with a set of one or more second qubits 36(0)-36(Q) that are maintained by the second quantum computing device 18. According to some examples, prior to the quantum computing system 10 performing operations using the entangled first qubits 34(0)-34(Q) and second qubits 36(0)-36(Q), the first quantum computing device 12 may induce an entangled state between each qubit of the one or more first qubits 34(0)-34(Q) and a corresponding qubit of the one or more second qubits 36(0)-36(Q), and then send the one or more second qubits 36(0)-36(Q) to the second quantum computing device 18 (e.g., via the quantum channel 32). Inducing the entangled state between the one or more first qubits 34(0)-34(Q) and the one or more second qubits 36(0)-36(Q) may be performed, e.g., using Quantum Assembly (QASM) files to apply a Hadamard gate to each of the one or more first qubits 34(0)-34(Q) to place them a state of superposition, and then apply a controlled NOT (CNOT) gate to each of the one or more second qubits 36(0)-36(Q), as a non-limiting example.

The first quantum computing device 12 of FIG. 1 executes one or more first services 38(0)-38(S), each of which may comprise a classical process or a quantum process that employs one or more of the first qubits 34(0)-34(Q). The one or more first services 38(0)-38(S) each access a first message bus 40, over which the one or more first services 38(0)-38(S) can send messages to one another for interservice communications. The first message bus 40 may comprise any conventional message bus and may support communications according to conventional messaging protocols. Similarly, the second quantum computing device 18 executes one or more second services 42(0)-42(V), which access a second message bus 44 for interservice communications, and the third computing device 24 executes one or more third services 46(0)-46(E), which access a third message bus 48 for interservice communications. Note that, while the one or more second services 42(0)-42(V) running on the second quantum computing device 18 may include classical processes and/or quantum processes, the one or more third services 46(0)-46(E) running on the third computing device 24 are all classical processes.

As discussed above, superdense encoding can be employed to reduce network traffic by decreasing the number of data bits transmitted via a communications network by half. Thus, it may be desirable to make use of superdense encoding for interservice communications between services on different quantum computing devices (e.g., the one or more first services 38(0)-38(S) of the first quantum computing device 12 and the one or more second services 42(0)-42(V) of the second quantum computing device 18). However, each service executing on the quantum computing device may have access only to its local message bus and may lack functionality for routing messages between different quantum computing devices. Moreover, superdense encoding functionality, and logic for selecting the appropriate use of superdense encoding versus conventional classical communication methods, may not be present in or available to the services.

Accordingly, examples disclosed herein provide mechanisms for providing a quantum message bus using superdense encoding. As seen in FIG. 1, the first quantum computing device 12 executes a first message bus listener service 50 that monitors interservice communications among the one or more first services 38(0)-38(S), as well as messages directed from one of the first service(s) 38(0)-38(S) to one of the second service(s) 42(0)-42(V) of the second quantum computing device 18 or the third service(s) 46(0)-46(E) of the third computing device 24. The first message bus listener service 50 and the one or more first services 38(0)-38(S) each may employ conventional mechanisms, such as publish-subscribe mechanisms, in accessing and using the first message bus 40. The first quantum computing device 12 also executes a first QCD service 52 that manages the one or more first qubits 34(0)-34(Q), and that provides superdense encoding functionality using the one or more first qubits 34(0)-34(Q). The second quantum computing device 18 likewise executes a second message bus listener service 54 and a second QCD service 56, while the third computing device 24 also executes a third message bus listener service 58.

In exemplary operation, the first message bus listener service 50 receives a first message 60 from a sending service (e.g., the first service 38(0), as a non-limiting example) directed to a recipient service, such as the second service 42(0) of the second quantum computing device 18. The first message bus listener service 50 identifies whether the second quantum computing device 18 to which the first message 60 is directed is a remote quantum computing device or a remote classical computing device. Some examples may provide that identification of the second quantum computing device 18 as a remote quantum computing device may be based on a service-to-device mapping, such as service-to-device mappings (captioned as "MAPPING" in FIG. 1) 62(0)-62(M) of a routing table 64 maintained by the first QCD service 52. In some such examples, each of the service-to-device mappings 62(0)-62(M) associates an identifier of a service of which the first QCD service 52 is aware with an identifier of a corresponding quantum computing device on which the service is running.

If the first message bus listener service 50 identifies the second quantum computing device 18 as a remote quantum computing device, the first message bus listener service 50 employs the first QCD service 52 to perform superdense encoding of the first message 60 using the one or more first qubits 34(0)-34(Q) that are entangled with the one or more second qubits 36(0)-36(Q) of the second quantum computing device 18. Some examples may provide that the first QCD service 52 may perform superdense encoding by first dividing the first message 60 into one or more compressible elements (captioned as "COMP. ELEMENT" in FIG. 1) 66(0)-66(Q) of two (2) classical bits each, with each of the compressible elements 66(0)-66(Q) corresponding to one of the first qubits 34(0)-34(Q) used to perform the superdense encoding. Superdense encoding is then performed for each compressible element of the one or more compressible elements 66(0)-66(Q) by, for example, transforming a Bell state of a corresponding qubit of the one or more first qubits 34(0)-34(Q). After performing superdense encoding, the first QCD service 52 sends the one or more first qubits 34(0)-34(Q) to the second quantum computing device 18 (e.g., via the quantum channel 32).

According to some examples, when the second QCD service 56 of the second quantum computing device 18 receives the one or more first qubits 34(0)-34(Q) from the first quantum computing device 12, the second QCD service 56 performs superdense decoding of the one or more first qubits 34(0)-34(Q) and the one or more second qubits 36(0)-36(Q) to obtain the first message 60. The second message bus listener service 54 of the second quantum computing device 18 then transmits the first message 60 to the recipient service 42(0) via the second message bus 44. Thus, the first message bus listener service 50, the first QCD service 52, the second message bus listener service 54, and the second QCD service 56 enable the first service 38(0) to communicate with the second service 42(0) as though connected by a single "quantum message bus," while taking advantage of the security and performance benefits provided by superdense encoding.

Some examples of the first message bus listener service 50, the second message bus listener service 54, and the third message bus listener service 58 may further act as bridges to enable communications between services running on quantum computing devices (such as the one or more first services 38(0)-38(S) running on the first quantum computing device 12) and services running on conventional classical computing devices (e.g., the one or more third services 46(0)-46(E) running on the third computing device 24). For example, the first message bus listener service 50, while monitoring the first message bus 40, may receive a second message 68 from a sending service such as the first service 38(0) directed to a recipient service such as the third service 46(0). The first message bus listener service 50 identifies the third computing device 24 as a remote classical computing device, and thus sends the second message 68 to the third computing device 24 via the classical communications link 30. The third message bus listener service 58 of the third computing device 24 may then route the second message 68 to the third service 46(0) via the third message bus 48.

It is to be understood that, because the first message bus listener service 50 and the first QCD service 52 is a component of the first quantum computing device 12, functionality implemented by the first message bus listener service 50 and the first QCD service 52 may be attributed to the quantum computing system 10 generally. Moreover, in examples where the first message bus listener service 50 and the first QCD service 52 comprise software instructions that program the first processor device 16 to carry out functionality discussed herein, functionality implemented by the first message bus listener service 50 and the first QCD service 52 may be attributed herein to the first processor device 16. It is to be further understood that while, for purposes of illustration only, the first message bus listener service 50 and the first QCD service 52 are depicted as single components, the functionality implemented by the first message bus listener service 50 and/or the first QCD service 52 may be implemented in any number of components, and the examples discussed herein are not limited to any particular number of components.

Figure 2A:
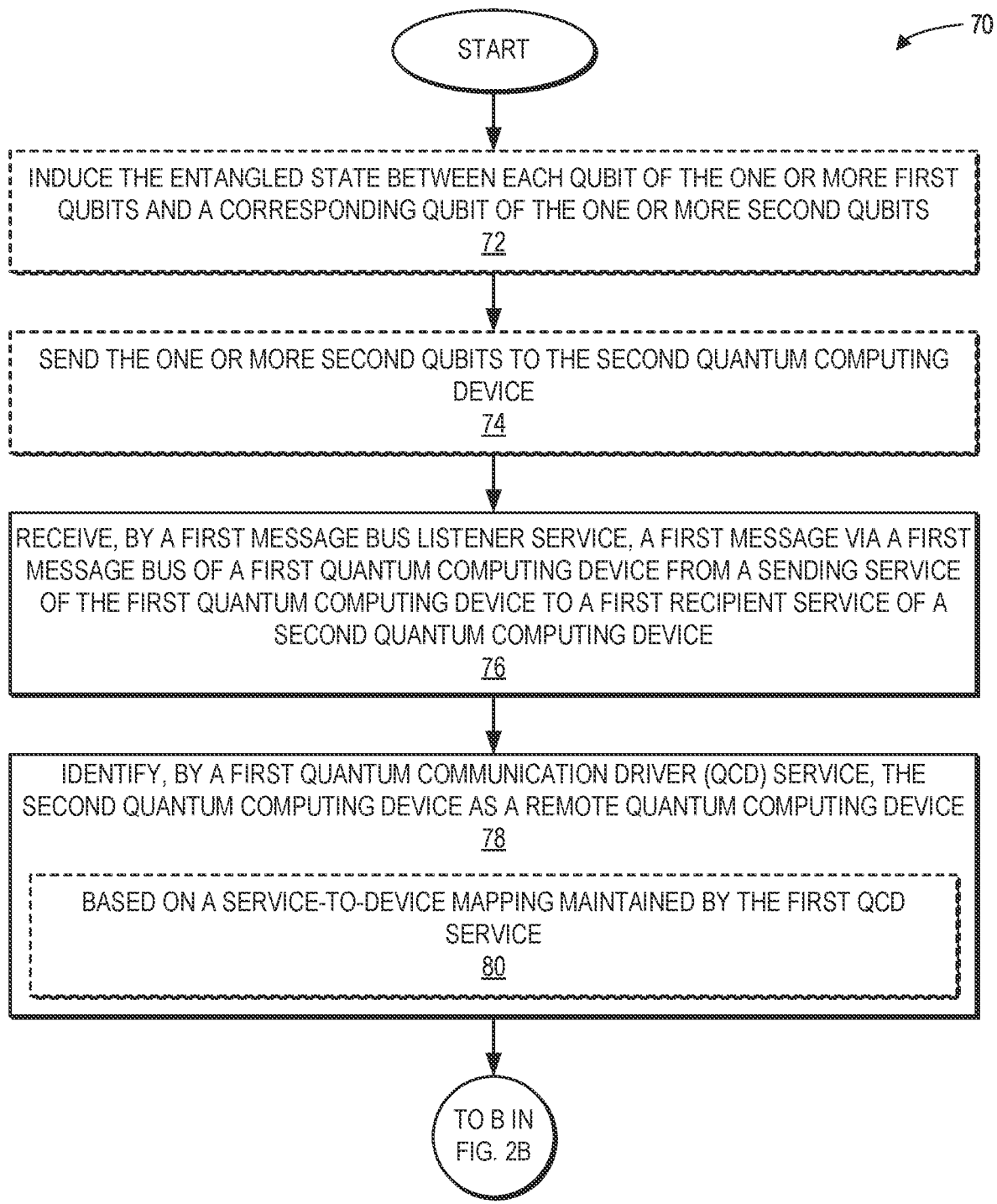
FIGS. 2A and 2B are flowcharts illustrating operations performed by a sending quantum computing device for providing a quantum message bus using superdense encoding, according to one example.
Figure 2B:
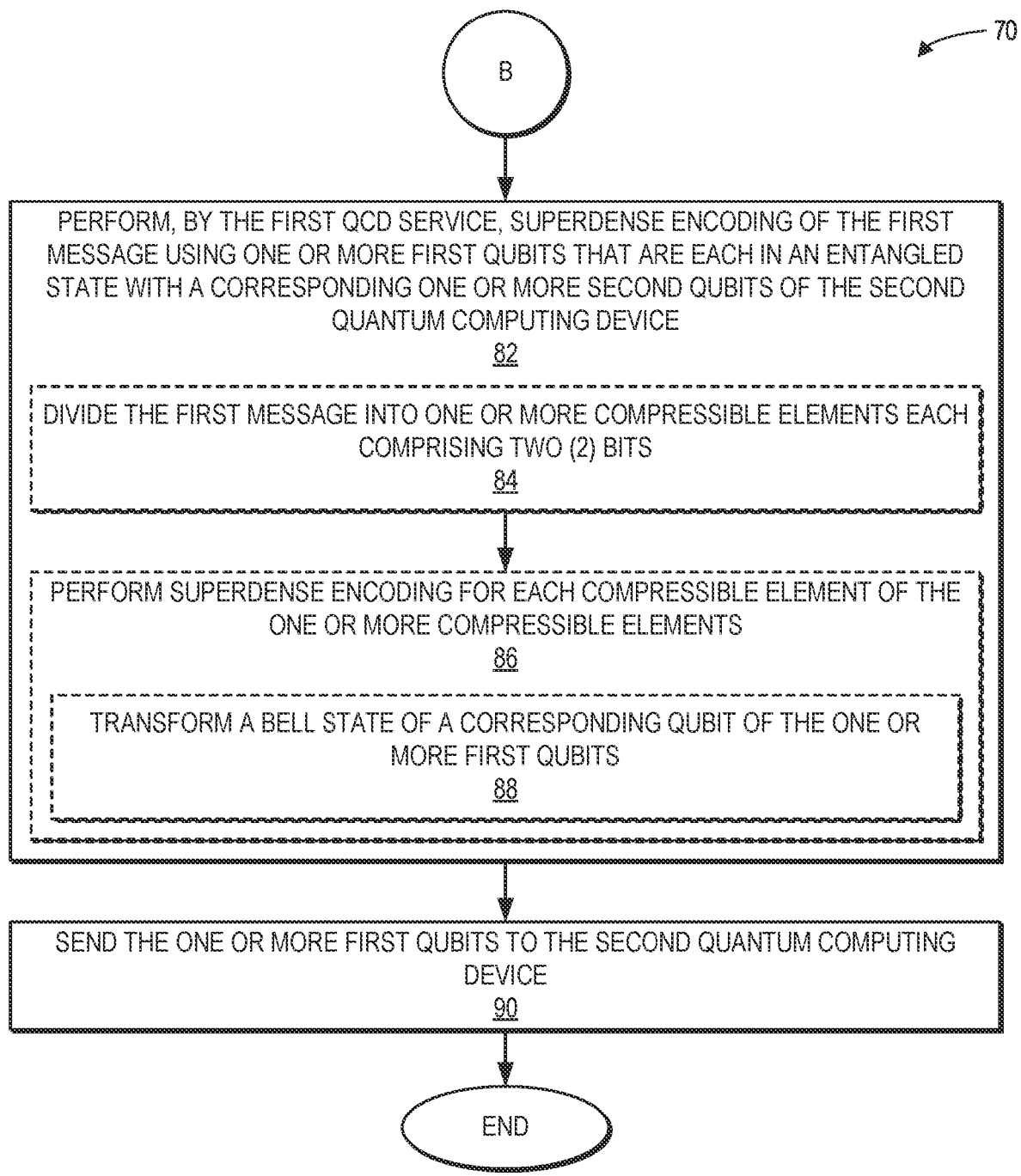

To illustrate exemplary operations performed by a sending quantum computing device (such as the first quantum computing device 12 of FIG. 1) for providing a quantum message bus using superdense encoding according to one example, FIGS. 2A and 2B provide a flowchart 70. Elements of FIG. 1 are referenced in describing FIGS. 2A and 2B for the sake of clarity. In FIG. 2A, operations according to some examples begin with the first processor device 16 of the first quantum computing device 12 inducing an entangled state between each qubit of the one or more first qubits 34(0)-34(Q) and a corresponding qubit of the one or more second qubits 36(0)-36(Q) (block 72). The first processor device 16 then sends the one or more second qubits 36(0)-36(Q) to the second quantum computing device 18 (e.g., via the quantum channel 32) (block 74).

The first message bus listener service 50 executed by the first processor device 16 receives the first message 60 via the first message bus 40 of the first quantum computing device 12 from a sending service, such as the first service 38(0), of the first quantum computing device 12, to a first recipient service, such as the second service 42(0), of the second quantum computing device 18 (block 76). The first QCD service 52 executed by the first processor device 16 then identifies the second quantum computing device 18 as a remote quantum computing device (block 78). In some examples, the operations of block 78 for identifying the second quantum computing device 18 as a remote quantum computing device is based on a service-to-device mapping, such as the service-to-device mapping 62(0), maintained by the first QCD service 52 (block 80). Operations then resume at block 82 of FIG. 2B.

Referring now to FIG. 2B, the first QCD service 52 performs superdense encoding of the first message 60 using the one or more first qubits 34(0)-34(Q) that are each in an entangled state with the corresponding one or more second qubits 36(0)-36(Q) of the second quantum computing device 18 (block 82). Some examples may provide that the operations of block 82 for performing superdense encoding of the first message 60 may comprise dividing the first message 60 into one or more compressible elements 66(0)-66(Q) each comprising two (2) bits (block 84). The first QCD service 52 next performs superdense encoding for each compressible element of the one or more compressible elements 66(0)-66(Q) (block 86). According to some examples, the operations of block 86 for performing superdense encoding for each compressible element of the one or more compressible elements 66(0)-66(Q) may comprise transforming a Bell state of a corresponding qubit of the one or more first qubits 34(0)-34(Q) (block 88). The first QCD service 52 then sends the one or more first qubits 34(0)-34(Q) to the second quantum computing device 18 (block 90).

Figure 3:
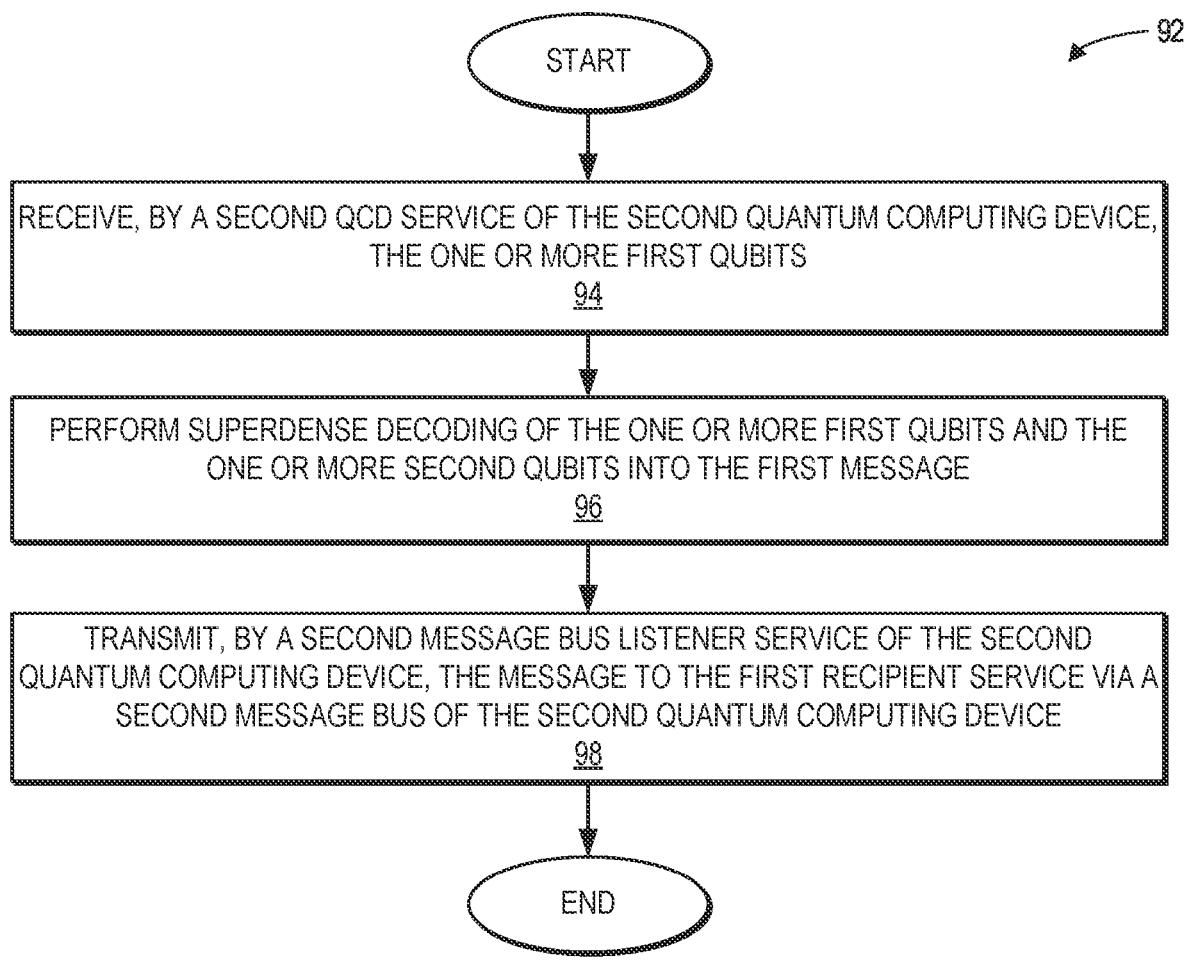
FIG. 3 is a flowchart illustrating operations performed by a recipient quantum computing device for receiving and decoding a superdense encoded message, according to one example.

FIG. 3 provides a flowchart 92 to illustrate operations performed by a recipient quantum computing device, such as the second quantum computing device 18 of FIG. 1, for receiving and decoding a superdense encoded message, according to one example. For the sake of clarity, elements of FIG. 1 are referenced in describing FIG. 3. In FIG. 3, operations begin with the second QCD service 56 of the second quantum computing device 18 receiving the one or more first qubits 34(0)-34(Q) (block 94). The second QCD service 56 next performs superdense decoding of the one or more first qubits 34(0)-34(Q) and the one or more second qubits 36(0)-36(Q) into the first message 60 (block 96). Finally, the second message bus listener service 54 of the second quantum computing device 18 transmits the first message 60 to the first recipient service 42(0) via the second message bus 44 of the second quantum computing device 18 (block 98).

Figure 4:
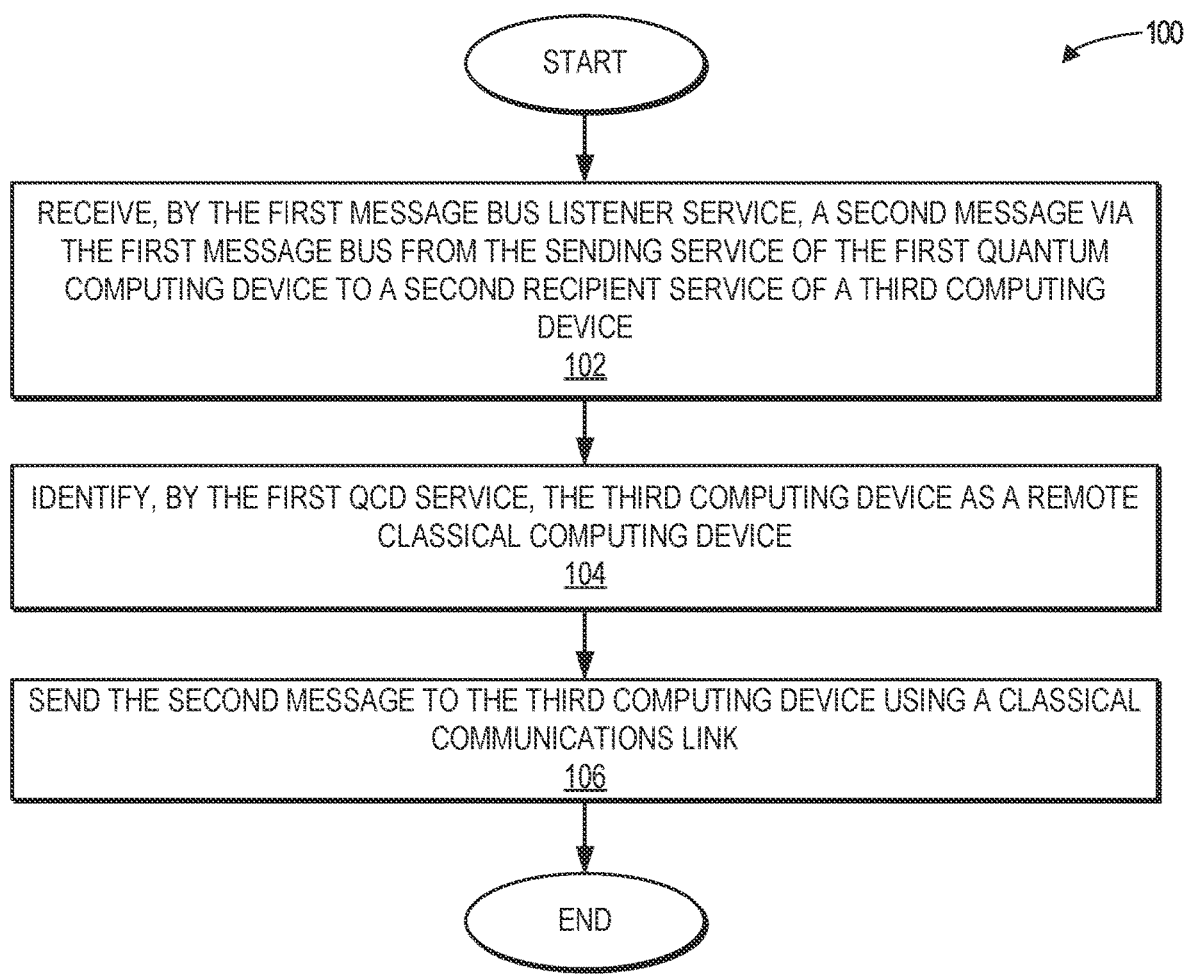
FIG. 4 is a flowchart illustrating operations performed by a sending quantum computing device for sending a message via a conventional communications link, according to one example.

To illustrate exemplary operations performed by a sending quantum computing device (such as the first quantum computing device 12 of FIG. 1) for sending a message via a conventional communications link, FIG. 4 provides a flowchart 100. Elements of FIG. 1 are referenced in describing FIG. 4 for the sake of clarity. Operations in FIG. 4 begin with the first message bus listener service 50 receiving the second message 68 via the first message bus 40 from the sending service 38(0) of the first quantum computing device to a second recipient service, such as the third service 46(0), of the third computing device 24 (block 102). The first QCD service 52 identifies the third computing device 24 as a remote classical computing device (block 104). The first QCD service 52 then sends the second message 68 to the third computing device 24 using a classical communications link 30 (block 106).

Figure 5:
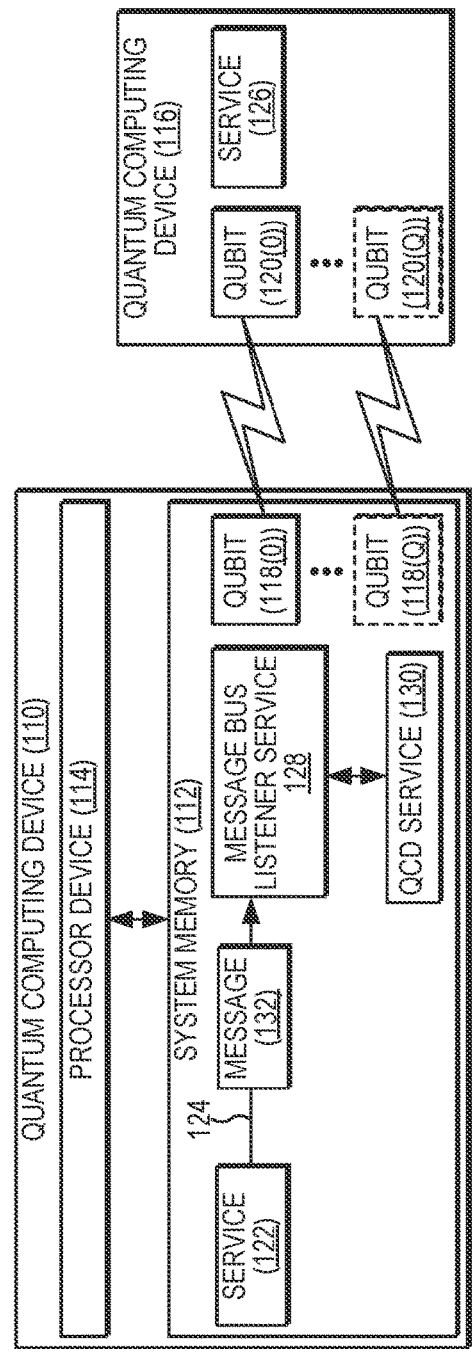
FIG. 5 is a simpler block diagram of the quantum computing device of FIG. 1 for providing a quantum message bus using superdense encoding, according to one example.

FIG. 5 is a simpler block diagram of the quantum computing system 10 of FIG. 1 for providing a quantum message bus using superdense encoding, according to one example. In the example of FIG. 5, the quantum computing system 108 includes a first quantum computing device 110 that comprises a first system memory 112 and a first processor device 114, and also includes a second quantum computing device 116 that is configured in a manner similar to the first quantum computing device 110. The first quantum computing device 110 maintains a set of one or more first qubits 118(0)-118(Q), which are in a state of entanglement with a set of one or more second qubits 120(0)-120(Q) that are maintained by the second quantum computing device 116. The first quantum computing device 110 of FIG. 5 executes a sending service 122 which accesses a first message bus 124 over which the sending service 122 can send messages for interservice communications. Similarly, the second quantum computing device 116 executes a first recipient service 126.

The first quantum computing device 110 executes a first message bus listener service 128 that monitors interservice communications on the first message bus 124. The first quantum computing device 110 also executes a first QCD service 130 that manages the one or more first qubits 118(0)-118(Q), and that provides superdense encoding functionality using the one or more first qubits 118(0)-118(Q). The first message bus listener service 128 receives a first message 132 from the sending service 122 directed to the first recipient service 126 of the second quantum computing device 116. The first message bus listener service 128 identifies the second quantum computing device 116 as a remote quantum computing device and employs the first QCD service 130 to perform superdense encoding of the first message 132 using the one or more first qubits 118(0)-118(Q) that are entangled with the one or more second qubits 120(0)-120(Q) of the second quantum computing device 116. After performing superdense encoding, the first QCD service 130 sends the one or more first qubits 118(0)-118(Q) to the second quantum computing device 116.

Figure 6:
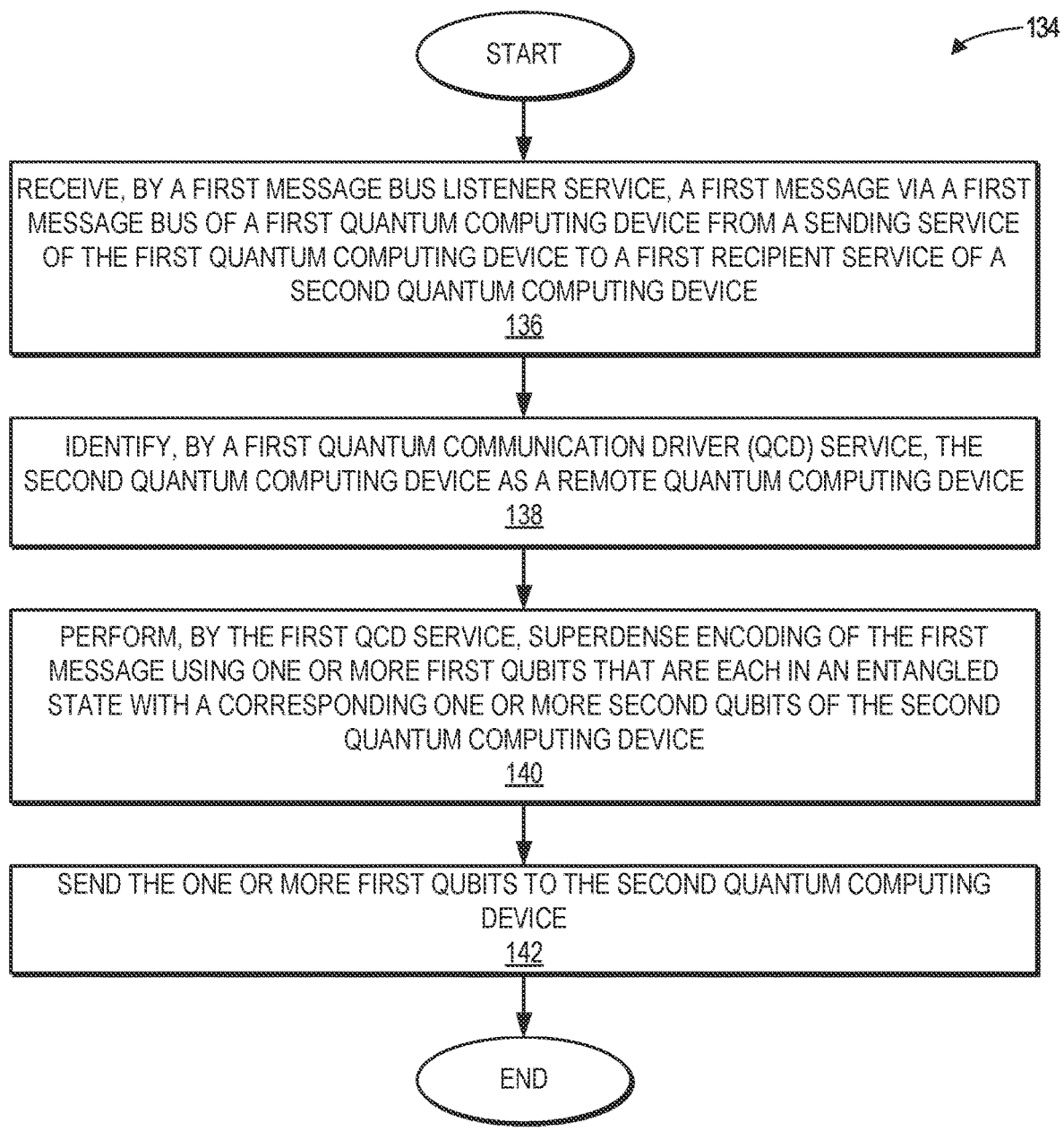
FIG. 6 is a flowchart of a simplified method for providing a quantum message bus using superdense encoding in the quantum computing device of FIG. 5, according to one example.

FIG. 6 provides a flowchart 134 of a simplified method for providing a quantum message bus using superdense encoding in the quantum computing system 108 of FIG. 5, according to one example. For the sake of clarity, elements of FIG. 5 are referenced in describing FIG. 6. In FIG. 6, operations begin with the first processor device 114 (e.g., executing the first message bus listener service 128 and the first QCD service 130) receiving the first message 132 via the first message bus 124 of the first quantum computing device 110 from the sending service 122 of the first quantum computing device 110 to the first recipient service 126 of the second quantum computing device 116 (block 136). The first QCD service 130 identifies the second quantum computing device 116 as a remote quantum computing device (block 138). The first QCD service 130 next performs superdense encoding of the first message 132 using the one or more first qubits 118(0)-118(Q) that are each in an entangled state with the corresponding one or more second qubits 120(0)-120(Q) of the second quantum computing device 116 (block 140). The first QCD service 130 then sends the one or more first qubits 118(0)-118(Q) to the second quantum computing device 116 (block 142).

Figure 7:
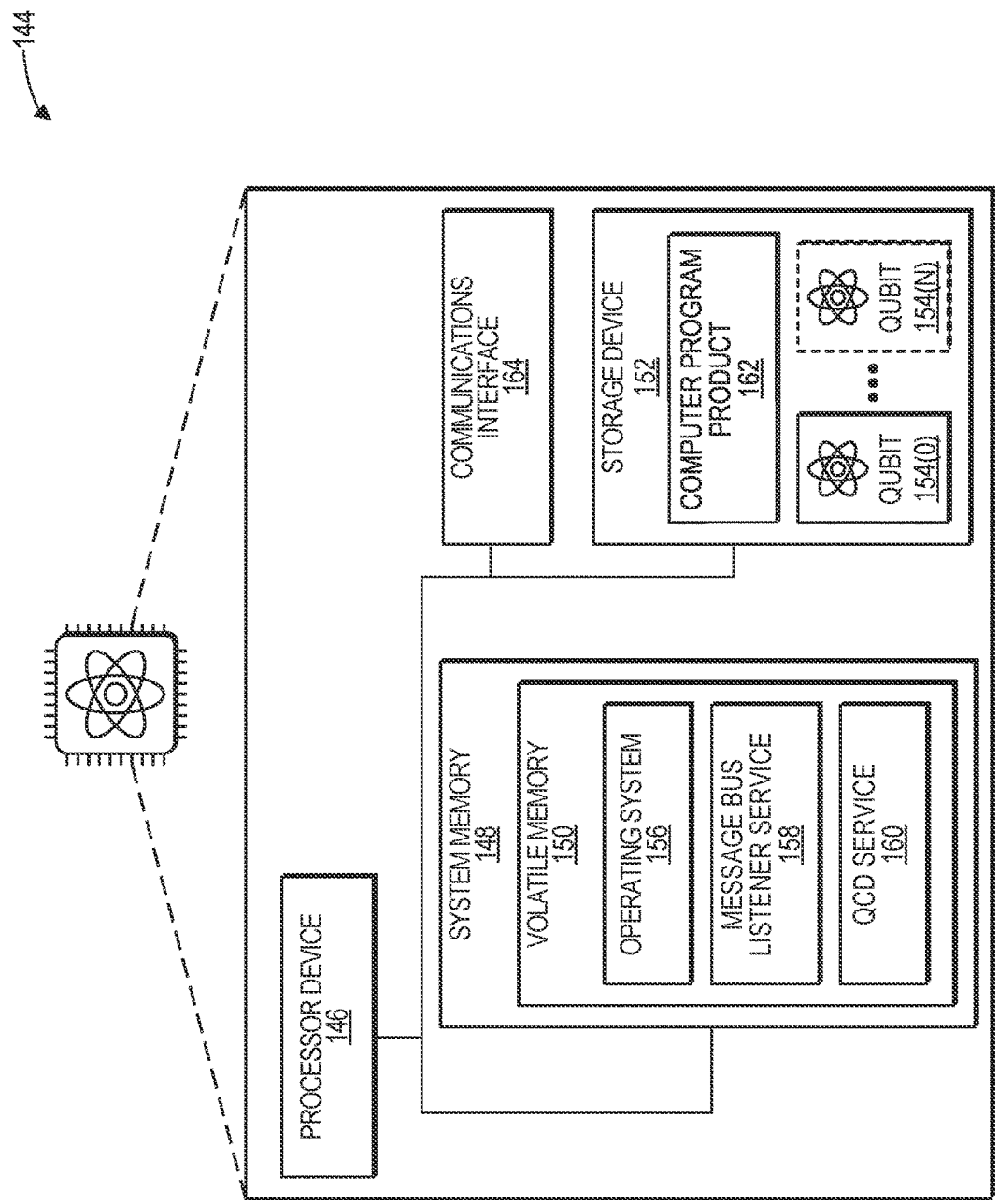
FIG. 7 is a block diagram of a quantum computing device suitable for implementing examples, according to one example.

FIG. 7 is a block diagram of a quantum computing device 144, such as the first quantum computing device 12 and the second quantum computing device 18 of FIG. 1, suitable for implementing examples according to one example. The quantum computing device 144 may comprise any suitable quantum computing device or devices. The quantum computing device 144 can operate using classical computing principles or quantum computing principles. When using quantum computing principles, the quantum computing device 144 performs computations that utilize quantum-mechanical phenomena, such as superposition and entanglement. The quantum computing device 144 may operate under certain environmental conditions, such as at or near zero degrees (0°) Kelvin. When using classical computing principles, the quantum computing device 144 utilizes binary digits that have a value of either zero (0) or one (1).

The quantum computing device 144 includes a processor device 146 and the system memory 148. The processor device 146 can be any commercially available or proprietary processor suitable for operating in a quantum environment. The system memory 148 may include volatile memory 150 (e.g., random-access memory (RAM)). The quantum computing device 144 may further include or be coupled to a non-transitory computer-readable medium such as a storage device 152. The storage device 152 and other drives associated with computer-readable media and computer-usable media may provide non-volatile storage of data, data structures, computer-executable instructions, and the like. The storage device may also provide functionality for storing one or more qubits 154(0)-154(N).

A number of modules can be stored in the storage device 152 and in the volatile memory 150, including an operating system 156 and one or more modules, such as a message bus listener service 158 and a QCD service 160. All or a portion of the examples may be implemented as a computer program product 162 stored on a transitory or non-transitory computer-usable or computer-readable medium, such as the storage device 152, which includes complex programming instructions, such as complex computer-readable program code, to cause the processor device 146 to carry out the steps described herein. Thus, the computer-readable program code can comprise computer-executable instructions for implementing the functionality of the examples described herein when executed on the processor device 146.

An operator may also be able to enter one or more configuration commands through a keyboard (not illustrated), a pointing device such as a mouse (not illustrated), or a touch-sensitive surface such as a display device. The quantum computing device 144 may also include a communications interface 164 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a first message bus listener service, a first message via a first message bus of a first quantum computing device from a sending service of the first quantum computing device to a first recipient service of a second quantum computing device;
   identifying, by a first quantum communication driver (QCD) service, the second quantum computing device as a remote quantum computing device;
   performing, by the first QCD service, superdense encoding of the first message using one or more first qubits that are each in an entangled state with a corresponding one or more second qubits of the second quantum computing device; and
   sending the one or more first qubits to the second quantum computing device.

2. The method of claim 1, wherein identifying the second quantum computing device as a remote quantum computing device is based on a service-to-device mapping maintained by the first QCD service.

3. The method of claim 1, further comprising:
   receiving, by a second QCD service of the second quantum computing device, the one or more first qubits;
   performing superdense decoding of the one or more first qubits and the one or more second qubits into the first message; and
   transmitting, by a second message bus listener service of the second quantum computing device, the first message to the first recipient service via a second message bus of the second quantum computing device.

4. The method of claim 1, further comprising:
   receiving, by the first message bus listener service, a second message via the first message bus from the sending service of the first quantum computing device to a second recipient service of a third computing device;
   identifying, by the first QCD service, the third computing device as a remote classical computing device; and
   sending the second message to the third computing device using a classical communications link.

5. The method of claim 1, further comprising, prior to receiving the first message:
   inducing the entangled state between each qubit of the one or more first qubits and a corresponding qubit of the one or more second qubits; and
   sending the one or more second qubits to the second quantum computing device.

6. The method of claim 1, wherein performing the superdense encoding of the first message comprises:
   dividing the first message into one or more compressible elements each comprising two (2) bits; and
   performing superdense encoding for each compressible element of the one or more compressible elements.

7. The method of claim 6, wherein performing superdense encoding for each compressible element of the one or more compressible elements comprises transforming a Bell state of a corresponding qubit of the one or more first qubits.

8. A computing system, comprising:
   a first quantum computing device, comprising:
      a first system memory;
      a first message bus; and
      a first processor device coupled to the first system memory and implementing one or more first qubits, the first processor device to:
         receive, using a first message bus listener service, a first message via the first message bus from a sending service of the first quantum computing device to a first recipient service of a second quantum computing device;
         identify, using a first quantum communication driver (QCD) service, the second quantum computing device as a remote quantum computing device;
         perform, using the first QCD service, superdense encoding of the first message using the one or more first qubits that are each in an entangled state with a corresponding one or more second qubits of the second quantum computing device; and
         send the one or more first qubits to the second quantum computing device.

9. The computing system of claim 8, wherein the first processor device is to identify the second quantum computing device as a remote quantum computing device based on a service-to-device mapping maintained by the first QCD service.

10. The computing system of claim 8, further comprising:
    the second quantum computing device, comprising:
       a second system memory;
       a second message bus; and
       a second processor device coupled to the second system memory and implementing the one or more second qubits, the second processor device to:
          receive, using a second QCD service of the second quantum computing device, the one or more first qubits;
          perform superdense decoding of the one or more first qubits and the one or more second qubits into the first message; and
          transmit, using a second message bus listener service of the second quantum computing device, the first message to the first recipient service via the second message bus.

11. The computing system of claim 8, wherein the first processor device is further to:
    receive, using the first message bus listener service, a second message via the first message bus from the sending service of the first quantum computing device to a second recipient service of a third computing device;
    identify, using the first QCD service, the third computing device as a remote classical computing device; and
    send the second message to the third computing device using a classical communications link.

12. The computing system of claim 8, wherein the first processor device is further to, prior to receiving the first message:
    induce the entangled state between each qubit of the one or more first qubits and a corresponding qubit of the one or more second qubits; and
    send the one or more second qubits to the second quantum computing device.

13. The computing system of claim 8, wherein to perform the superdense encoding of the first message is to:
    divide the first message into one or more compressible elements each comprising two (2) bits; and
    perform superdense encoding for each compressible element of the one or more compressible elements.

14. The computing system of claim 13, wherein to perform superdense encoding for each compressible element of the one or more compressible elements is to transform a Bell state of a corresponding qubit of the one or more first qubits.

15. A non-transitory computer-readable medium having stored thereon computer-executable instructions that, when executed, cause one or more processor devices to:
   receive a first message via a first message bus from a sending service of a first quantum computing device to a first recipient service of a second quantum computing device;
   identify the second quantum computing device as a remote quantum computing device;
   perform superdense encoding of the first message using one or more first qubits that are each in an entangled state with a corresponding one or more second qubits of the second quantum computing device; and
   send the one or more first qubits to the second quantum computing device.

16. The non-transitory computer-readable medium of claim 15, wherein the computer-executable instructions further cause the one or more processor devices to:
   receive the one or more first qubits;
   perform superdense decoding of the one or more first qubits and the one or more second qubits into the first message; and
   transmit the message to the first recipient service via a second message bus.

17. The non-transitory computer-readable medium of claim 15, wherein the computer-executable instructions further cause the one or more processor devices to:
   receive a second message via the first message bus from the sending service of the first quantum computing device to a second recipient service of a third computing device;
   identify the third computing device as a remote classical computing device; and
   send the second message to the third computing device using a classical communications link.

18. The non-transitory computer-readable medium of claim 15, wherein the computer-executable instructions further cause the one or more processor devices to, prior to receiving the first message:
   induce the entangled state between each qubit of the one or more first qubits and a corresponding qubit of the one or more second qubits; and
   send the one or more second qubits to the second quantum computing device.

19. The non-transitory computer-readable medium of claim 15, wherein to perform the superdense encoding of the first message is to:
   divide the first message into one or more compressible elements each comprising two (2) bits; and
   perform superdense encoding for each compressible element of the one or more compressible elements.

20. The non-transitory computer-readable medium of claim 19, wherein to perform superdense encoding for each compressible element of the one or more compressible elements is to transform a Bell state of a corresponding qubit of the one or more first qubits.

* * * * *